UNITED STATES PATENT OFFICE.

HENRY D. HIBBARD, OF PLAINFIELD, NEW JERSEY.

PROCESS OF MANUFACTURING STEEL.

1,035,120.  Specification of Letters Patent.  Patented Aug. 6, 1912.

No Drawing. Application filed December 24, 1908. Serial No. 469,151.

*To all whom it may concern:*

Be it known that I, HENRY D. HIBBARD, a citizen of the United States of America, residing at Plainfield, in the county of Union and State of New Jersey, have invented a certain new and Improved Process of Manufacturing Steel, of which the following is a specification.

The present invention relates to an improved process of manufacturing steel and its object is to expedite and cheapen the process of manufacturing steel from crude iron, particularly in an open hearth furnace.

In some cases the present process may at one stage thereof involve the utilization of the calorific properties of the metalloids in crude iron as described in my patent No. 885,248 granted April 21, 1908.

Broadly stated the present process contemplates the elimination from crude iron by oxid of iron at a temperature below that of molten steel, of the metalloids contained therein which give the oxid of iron exothermic reactions and the subsequent treatment of this mass with oxid of iron at a higher temperature to eliminate the carbon to any desired degree for the production of steel. These treatments are carried out in separate vessels, the first in a closed vessel or reactor by which is meant one with a continuous envelop and without passages for the admission of fuel or air, the only openings being for charging and discharging the vessel, and these being closable, if preferred, during the reaction, and the second in a steel furnace, preferably of the open hearth type, the transfer to the steel furnace being accompanied by the partial or complete separation of the slag formed during the first step. The oxid of iron employed may be of any suitable type (for instance cinder richly charged with oxid) and it may be introduced into either vessel in either the solid or the molten state.

For carrying out the process in all its variations it is preferable to utilize (1) a furnace for heating or melting the oxid of iron. In certain cases this furnace may be dispensed with, as for instance when the crude iron has a sufficiently high percentage of silicon to furnish by its heat of combustion a sufficient amount of heat to melt the oxid of iron, and when the oxid of iron is to be added to the steel furnace in the solid form, (2) A closed reaction vessel, preferably of the type described in my Patent 885,248 and (3) a steel furnace preferably of the open hearth type, heated by fuel, electricity or any other suitable means.

The process may be carried out as follows: The reaction vessel and steel furnace being heated to their appropriate temperatures, viz. red and white heat respectively, a quantity of oxid of iron at least sufficient for one charge of the reactor, is heated (melted if necessary) in the oxid furnace. A charge of molten crude iron is run into the reaction vessel, the heated oxid of iron introduced and the two thoroughly mixed in the reaction vessel. Further additions of oxid are made, if required, to complete the reaction. When the crude iron has been sufficiently refined and purified it is poured into a ladle and taken to the steel furnace.

The steel furnace may have had previously introduced therein the oxid of iron which is to be utilized to oxidize the carbon of the charge coming from the reaction vessel. A quantity of scrap metal may also be introduced to form part of the charge, if desired. Into the steel furnace so charged, the metal from the reaction vessel is poured, the slag being withheld in whole or in part for a reason to be presently explained. After the oxidization and consequent elimination of the carbon to a sufficient degree, the charge is ready to be finished and drawn off in the customary manner. I prefer to introduce several charges from the reaction vessel to the steel furnace before the latter is drawn off, in each case accompanying the same with a fresh supply of oxid—introduced just before or just after the charge from the reaction vessel, so that the entire charge in the steel furnace is largely freed from carbon before the next charge from the reaction vessel is introduced. This method of charging the steel furnace by degrees may be accomplished without undue cooling due to the consumption of heat in the elimination of carbon by oxid of iron since the entire heat of the furnace is concentrated upon the added part of the charge and the blanket of slag is of the minimum practicable thickness.

The withholding of a part of the slag of the reaction vessel from the charge as introduced therefrom into the steel furnace, results in a decided advantage since the bulk of the silicon and phosphorus of the crude iron are thus eliminated and the large quantity of bases which would be necessary if a more basic slag is desired in the steel furnace to chemically satisfy them is rendered unnecessary thereby avoiding the formation of a heavy slag. This heavy slag would seriously retard the effect of any solid oxid employed, both by diluting it and by preventing the smaller pieces from reaching the metal at all, while the large pieces would have less contact with the metal. Furthermore such heavy slag would act as a blanket keeping the heat of the flame away from the metal to an undesirable degree and so prolong the process. It is to be understood however that it is desirable to introduce a portion of the slag from the reaction vessel into the steel furnace, since it will there supply part of the acid needed to prevent the steel furnace slag from becoming too infusible; it will also carry a portion of the oxid of iron needed in the steel furnace slag and thus reduce by so much the amount of oxid of iron necessary to be there added, and it will further save the heat and time required to melt the slag-forming materials otherwise necessary. But the amount of slag so introduced is small since one of the features of the process is the maintenance of as thin a slag blanket in the steel furnace as is practicable to protect the metal from the free oxygen of the air introduced.

A further great advantage of the process arises from the relatively low temperature of the metal in the reaction vessel which favors the elimination of phosphorus from the metal while retarding the oxidation of the carbon.

A third great advantage of the process where a plurality of charges from the reaction vessel are introduced into the steel furnace, results from the fact that each charge of the metal from the reaction vessel is largely decarbonized before the addition of the next charge and the operation of the steel furnace is thereby much hastened.

The expression "exothermic reactions" is used to designate reactions which yield more heat than they consume so that there is an excess of sensible heat afforded by which the temperature of the mixture will be higher than otherwise.

The process described may be varied without departing from my invention, and I do not limit myself to the precise details or instrumentalities described in carrying out the same.

I claim as my invention:

1. In the process of making steel from crude iron, the addition of a quantity of heated oxid of iron to a bath of crude iron to remove from the latter those elements thereof which give an exothermic reaction with oxid of iron, the transfer of the iron so purified together with a portion of the slag of said reaction, to a suitable steel furnace and the subjection of the charge in said steel furnace to the action of a further quantity of oxid of iron to oxidize the excess of carbon present by endothermic reaction, substantially as described.

2. In the process of making steel from crude iron, the addition of a quantity of heated oxid of iron to a bath of crude iron, in a closed vessel at approximately its fusing temperature, to remove from the latter those elements thereof which give an exothermic reaction with oxid of iron, the transfer of the iron so purified together with a portion of the slag of said reaction, to a suitable steel furnace and the subjection of the charge in said steel furnace to external heat and to the action of a further quantity of oxid of iron to oxidize the carbon present by endothermic reaction, substantially as described.

3. In the process of making steel, the formation of a steel charge by introducing into a steel furnace successive charges of molten iron together with a portion of its slag from a reaction vessel in which said molten iron has been subjected to the action of oxid of iron to substantially eliminate the metalloids giving an exothermic reaction with said oxid of iron.

4. In the process of making steel, the formation of a steel charge by introducing into a steel furnace successive charges of molten iron together with a predetermined portion of its slag from a reaction vessel in which said molten iron has been subjected to the action of oxid of iron to substantially eliminate the metalloids giving an exothermic reaction with said oxid of iron, and adding a quantity of oxid of iron with each charge in the steel furnace in order to eliminate the excess of carbon by the endothermic reaction of said oxid of iron and carbon under the influence of heat in said furnace.

5. In the process of making steel, the formation of a steel charge by introducing into a steel furnace successive component charges of molten iron from which the silicon has previously been eliminated by reaction with oxid of iron, and eliminating in the steel furnace the greater part of the carbon from each component charge before the addition of the succeeding component charge.

6. In the process of making steel, the formation of a steel charge by introducing into a steel furnace successive component charges of molten iron from which the silicon has previously been eliminated by reaction with oxid of iron, and treating each component charge with an excess of oxid of iron to substantially eliminate the carbon present therein before adding the succeeding component charge.

7. In the process of making steel, the subjection of a charge of metal to reaction with oxid of iron to eliminate the silicon therefrom, the transfer of said silicon purified charge in molten condition together with a predetermined proportion of its slag to a steel furnace and the subjection of said charge in the steel furnace to reaction with a further quantity of oxid of iron to eliminate the carbon therefrom.

In testimony whereof I have signed my name to this specification, in the presence of two subscribing witnesses.

HENRY D. HIBBARD.

Witnesses:
WALTER ABBE,
WILLIAM ABBE.